(12) United States Patent
Withers et al.

(10) Patent No.: US 9,890,894 B2
(45) Date of Patent: Feb. 13, 2018

(54) COMPOSITE STRUCTURAL REINFORCEMENT REPAIR DEVICE

(71) Applicant: MILLIKEN INFRASTRUCTURE SOLUTIONS, LLC, Spartanburg, SC (US)

(72) Inventors: Genevieve Janet Withers, Houston, TX (US); James Michael Souza, Houston, TX (US)

(73) Assignee: Milliken Infrastructure Solutions, LLC, Spartanburg, SC (US)

(*) Notice: Subject to any disclaimer, the term of this patent is extended or adjusted under 35 U.S.C. 154(b) by 355 days.

(21) Appl. No.: 14/120,891

(22) Filed: Jul. 9, 2014

(65) Prior Publication Data

US 2016/0010780 A1   Jan. 14, 2016
US 2017/0211742 A9   Jul. 27, 2017

Related U.S. Application Data

(63) Continuation-in-part of application No. 12/947,762, filed on Nov. 16, 2010, now abandoned.

(51) Int. Cl.
| | |
|---|---|
| *B29C 73/00* | (2006.01) |
| *F16L 55/16* | (2006.01) |
| *B29C 63/10* | (2006.01) |
| *B29C 65/00* | (2006.01) |
| *B29C 53/78* | (2006.01) |

(Continued)

(52) U.S. Cl.
CPC ......... *F16L 55/1683* (2013.01); *D06M 11/74* (2013.01); *D06M 11/77* (2013.01); *D06M 15/55* (2013.01); *D06M 15/564* (2013.01); *E04C 5/07* (2013.01); *E04G 23/0218* (2013.01); *F16L 55/1656* (2013.01); *F16L 55/1686* (2013.01); *F16L 55/175* (2013.01); *F16L 57/02* (2013.01); *F16L 57/06* (2013.01); *B29C 65/483* (2013.01); *B29C 65/4865* (2013.01); *B29C 73/10* (2013.01); *E04C 3/34* (2013.01)

(58) Field of Classification Search
CPC . F16L 55/1683; F16L 55/1686; F16L 55/175; B29C 65/48; B29C 65/483; B29C 65/4865; B29C 73/10
USPC ....... 156/60, 71, 94, 98, 153, 184, 185, 187, 156/191, 192, 195, 196, 212, 213, 215, 156/276, 278, 279; 138/97, 98, 99
See application file for complete search history.

(56) References Cited

U.S. PATENT DOCUMENTS

| | | | |
|---|---|---|---|
| 5,632,307 A | 5/1997 | Fawley et al. ................. | 138/99 |
| 2002/0180077 A1* | 12/2002 | Glatkowski .......... | A61K 9/0092 264/36.1 |

(Continued)

OTHER PUBLICATIONS

Patent Cooperation Treaty PCT International Search Report, dated Oct. 7, 2015. International Application No. PCT/US2015/039384. International Filing Date: Jul. 7, 2015.

*Primary Examiner* — Philip C Tucker
*Assistant Examiner* — Brian R Slawski
(74) *Attorney, Agent, or Firm* — Cheryl J. Brickey

(57) ABSTRACT

A fabric device for application on a degraded area of a member for rehabilitating the member. A fabric device in accordance with the present invention comprises at least one layer of composite fabric, which has a first surface and a second surface spaced-apart from the first surface, nanomaterial on at least one surface of the fabric, and a resin matrix on the fabric over the nanomaterial. The resin matrix may also comprise nanomaterial therein.

4 Claims, 20 Drawing Sheets

(51) Int. Cl.

| | |
|---|---|
| *B29D 22/00* | (2006.01) |
| *B32B 43/00* | (2006.01) |
| *B32B 37/00* | (2006.01) |
| *B65C 3/16* | (2006.01) |
| *B65H 81/00* | (2006.01) |
| *F16L 55/168* | (2006.01) |
| *F16L 55/175* | (2006.01) |
| *D06M 15/55* | (2006.01) |
| *D06M 15/564* | (2006.01) |
| *D06M 11/74* | (2006.01) |
| *D06M 11/77* | (2006.01) |
| *E04G 23/02* | (2006.01) |
| *E04C 5/07* | (2006.01) |
| *F16L 57/02* | (2006.01) |
| *F16L 57/06* | (2006.01) |
| *F16L 55/165* | (2006.01) |
| *B29C 73/10* | (2006.01) |
| *B29C 65/48* | (2006.01) |
| *E04C 3/34* | (2006.01) |

(56) References Cited

U.S. PATENT DOCUMENTS

| | | | |
|---|---|---|---|
| 2004/0067364 A1* | 4/2004 | Ishikawa | B32B 5/26 |
| | | | 428/411.1 |
| 2010/0294389 A1 | 11/2010 | Souza et al. | 138/110 |
| 2014/0048164 A1* | 2/2014 | Souza | F16L 55/172 |
| | | | 138/97 |

\* cited by examiner

COMPOSITE STRUCTURAL REINFORCEMENT REPAIR DEVICE

CROSS-REFERENCE TO RELATED APPLICATIONS

The present application is a Continuation-in-Part of prior U.S. application Ser. No. 12/947,762 filed on Nov. 16, 2010, which application being hereby incorporated by reference herein in its entirety. The '762 application, in turn, claims the benefit of the filing date of U.S. Provisional Application No. 61/281,410 filed Nov. 17, 2009.

BACKGROUND OF THE INVENTION

Field of the Invention

The present invention is directed to a device for repairing or reinforcing a member such as a tubular member, a pipeline, or structural support, which device comprises fabric and nanomaterial toughening and strengthening material and a polymer matrix.

Description of Related Art

A wide variety of devices, apparatuses, systems and methods for repairing or reinforcing members such as pipe, pipelines, and structural members are known, including, but not limited to, the disclosures in U.S. Pat. Nos. 4,700,752; 5,348,801; 5,445,848; 5,632,307; 4,676,276; 6,276,401; 6,774,066; 7,387,138; 7,426,942; 7,367,362; 7,500,494; 7,523,764, all incorporated fully herein for all purposes.

Structural members can be degraded, i.e. physically damaged or deteriorated due to cyclic loading fatigue enhanced by corrosion, erosion, temperature fluctuations, natural causes, third party causes, and time. Degraded members often require repair and/or reinforcement to preserve and/or restore their integrity and extend their useful life. The problems resulting from damage and deterioration affect piping systems which are subject to deterioration due to several factors, including sulfate reducing bacteria, galvanic action, and third party damage. The problem is not limited to piping systems. It also affects other structures such as piling, concrete columns, petroleum storage tanks, etc. which are subject to deterioration and damage.

Older methods of repairing damaged pipelines comprise the replacement of the damaged or defective pipe section with new pipe or the installation of a metal sleeve over the damaged or defective area. Depressurizing the pipe or putting the pipe out of service while the pipe replacement is performed is often required for these known pipe repair methods. This procedure can become costly and inconvenient for the pipeline owner as well as the general public.

Advances in composite materials and methods in the past two decades have introduced composites as a more widely accepted repair method for piping and infrastructure rehabilitation. Composites have offered owners of pipelines a cost-effective alternative to the disruption of service caused by pipe replacement or steel sleeves because composite repairs can be applied to the damaged areas while the pipeline is still in operation.

Known pipe repair and reinforcement systems include a fabric impregnated with a moisture-curing polyurethane polymer system or a fabric impregnated with a resin polymer in the field during installation of the product or a cured pre-form that is bonded with an adhesive as it is wrapped around a member. These products provide reasonable performance and service life. However, there is a need for improved performance especially in the area of extended fatigue/service life.

Permanence of a Fiber Reinforced Polymer, "FRP" composite repair is a requirement for pipeline repair methods under current DOT regulations (49 CFR §§ 192, 195; incorporated fully herein). The question of permanence of some FRP composite repairs has become of great concern to pipeline owners due to delaminations due to fatigue of some composite systems.

Consequently, these failed FRP's have provided questionable permanent repairs. DOT has ruled that FRP repairs are temporary unless the pipe is repaired by a method that reliable engineering tests and analyses show permanently restores the serviceability of the pipe.

SUMMARY OF THE INVENTION

In accordance with the present invention, a fabric device is provided for an in-situ application on an area of a structural member. A fabric device according to the present invention comprises at least one layer of fabric which is formed of a composite material having first and second spaced apart surfaces and nanomaterials (as defined herein). A fabric device according to the present invention further comprises a resin matrix on the fabric which covers the nanomaterials.

In one embodiment of the present invention, at least one layer of fabric in the fabric device is formed from fibers which themselves contain nanomaterials. In another embodiment of the present invention, the nanomaterials are bonded to one or both surfaces of the fabric. In yet another embodiment of the present invention, the nanomaterials are in the matrix and then applied to one or both surfaces of the fabric which may or may not contain nanomaterials.

As described herein, the "fabric," before treatment according to the present invention, can be any suitable known fabric, cloth, fibrous item, material, or webbing, e.g. made of natural fibers or synthetic fibers (or any combination thereof), made by any known method, e.g. woven, stitched, weaved, knitted, braided or non-woven. The term "nanomaterials" as used in this disclosure, is intended to include any suitable known nanoscale material including without limitation nanotubes, (in any form), nanofibers, nanoclays, bucky paper, nanowire, graphene and nanoinclusions (treated or untreated), or any combination thereof. Those of ordinary skill in the art will understand that the term "nanoscale" or "nanoscale material" refers to structures and materials with a length scale applicable to nanotechnology, usually cited as 1-100 nanometers (billionths of a meter) The resin matrix may, for example, may be thermosetting resins, e.g. epoxy, thermoset polymers, polyurethane resins or thermoplastic polymers.

A fabric device according to the present invention may further comprise nanomaterials in the resin matrix to inhibit crack propagation.

In certain embodiments, a device according to the present invention includes a high strength fabric (e.g., fiber, veil, cloth, webbing) made from any high tenacity fiber such as, but not limited to, fiberglass, carbon fiber, p-aramid fiber, liquid crystal polymer fiber, and any combinations thereof, that has nanomaterial (nanotubes, nanofibers, nanoclays, bucky paper, graphene or any combination thereof) embedded on a surface or surfaces of the fabric and which, when combined with a curable resin matrix, forms a pressure-containing or structural reinforcement with improved properties such as improved interfacial fracture toughness, thus resulting in extended fatigue and service life, e.g., under natural force conditions such as seismic waves from earthquakes.

DETAILED DESCRIPTION OF THE INVENTION

It will be appreciated that the present invention may take many forms and embodiments. In the following description, some embodiments of the invention are described and numerous details are set forth to provide an understanding of the present invention. Those skilled in the art will appreciate, however, that the present invention may be practiced without those details and that numerous variations and modifications from the described embodiments may be possible. The following description is thus intended to illustrate and not to limit the present invention.

One embodiment of a fabric device according to the present invention comprises a fabric which is formed from fibers which themselves contain nanomaterials. In yet another embodiment of a fabric device in accordance with the present invention the fabric has nanomaterials applied to it.

Figure 1A:
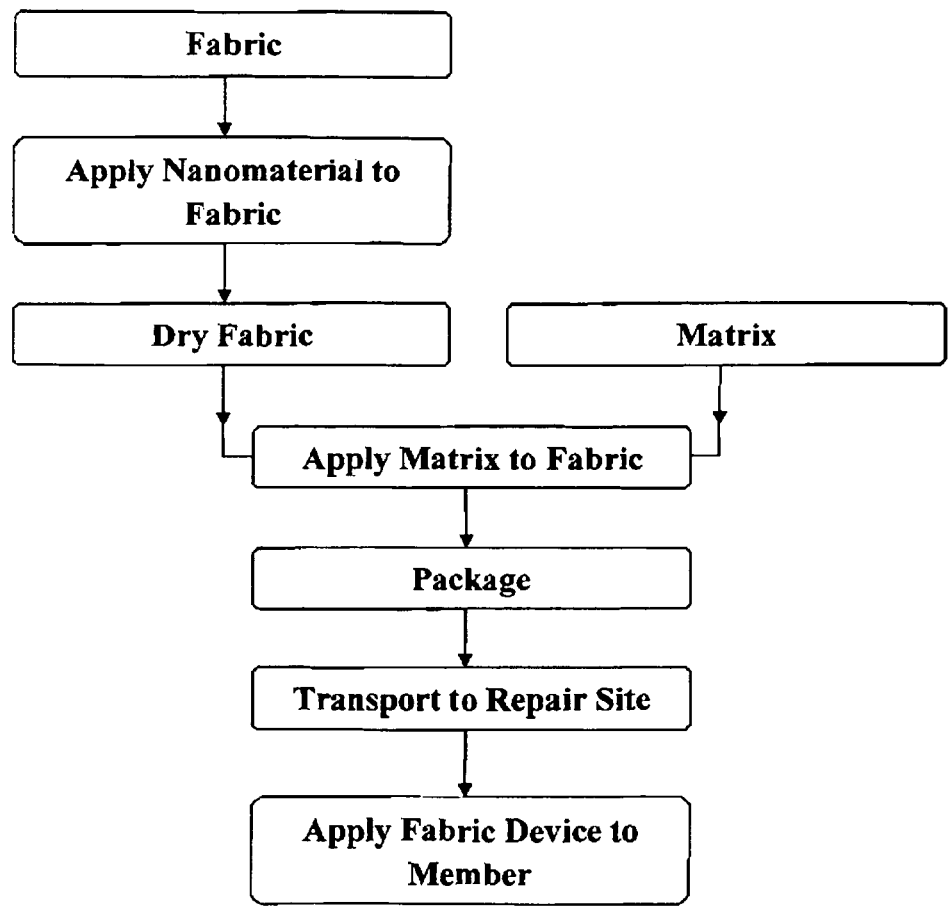
FIG. 1A is a flow diagram illustrating a method according to the present invention.

FIG. 1A shows schematically a method in which fabric ("Fabric") is provided and then has nanomaterial applied to it. The fabric is any fabric as defined above. The nanomaterial is any nanomaterial as defined above. The nanomaterial is applied onto the fabric, to one or both surfaces, by any application method or apparatus, including, but not limited to, by dipping, spraying, sprinkling, electro-static deposition, electro-spun, electrophoresis or manually (e.g. with a roller, trowel, brush, etc.). The nanomaterial may be in a suitable solution. In one aspect the nanomaterial is in a solvent solution.

The fabric with the applied nanomaterial is then dried ("Dry Fabric"), e.g. to remove solution material, e.g. water and/or solvent (e.g. alcohol, ethanol, acetone). A matrix is then applied to the dried fabric ("Apply Matrix"). Any suitable matrix material may be used, as defined above. In one aspect, the matrix is a resin, e.g. an epoxy resin, a thermoset resin, a polyurethane resin, or a thermoplastic resin.

The fabric device, fabric treated with the nanomaterial and the matrix, is then made into discrete amounts, e.g. for packaging ("Package") and shipping or for installation.

Figure 1B:
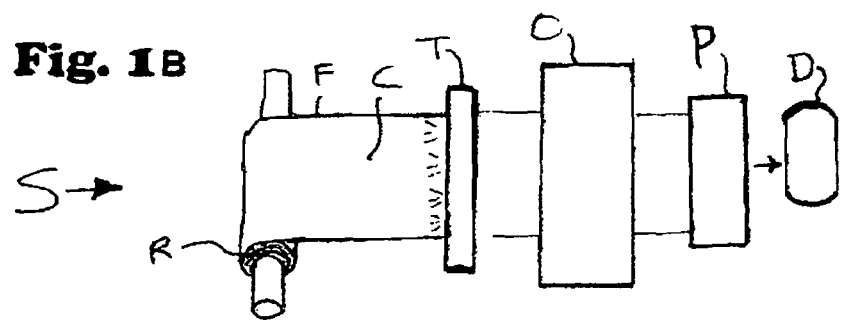
FIG. 1B is a flow diagram illustrating a method according to the present invention.

FIG. 1B illustrates schematically a system S for making a device D according to the present invention. Fabric from a roll R of fabric F (any fabric as defined above) is supplied to a deposition apparatus T which deposits nanomaterial (any as defined above) in solution onto a surface C of fabric F. The thus-treated fabric is then dried in an oven 0 to remove solution material (e.g. solvent).

Treated fabric A is then introduced to apparatus P for sizing, cutting, wrapping, packaging, etc. A finished fabric device D is ready for use or shipment. In one aspect a package with a device according to the present invention is hermetically sealed and aluminized plastic package material is used.

In certain embodiments, a fabric device according to the present invention, with a matrix applied thereto, is packaged and then sent to the field for use. For example, and not by way of limitation, a fabric device according to the present invention, made in accordance with the methods of FIG. 1A or FIG. 1B, may have nanomaterial material applied to fabric, the fabric then dried, then impregnated with a resin (e.g., but not limited to, polyurethane resin) and then packaged in packaging material, e.g., a dehumidified foil pouch. The packaged fabric device is sent to the field for application to a member that needs reinforcing and/or repair.

Figure 1C:
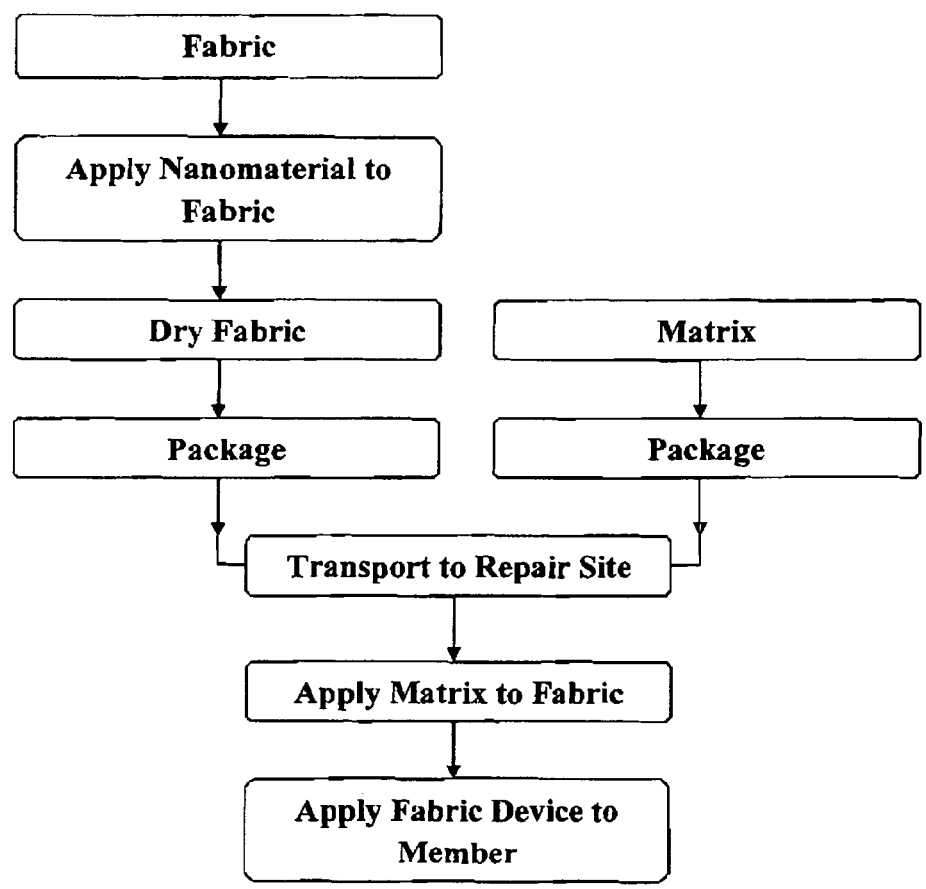
FIGS. 1C-1M are flow diagrams illustrating methods according to the present invention.
Figure 1D:
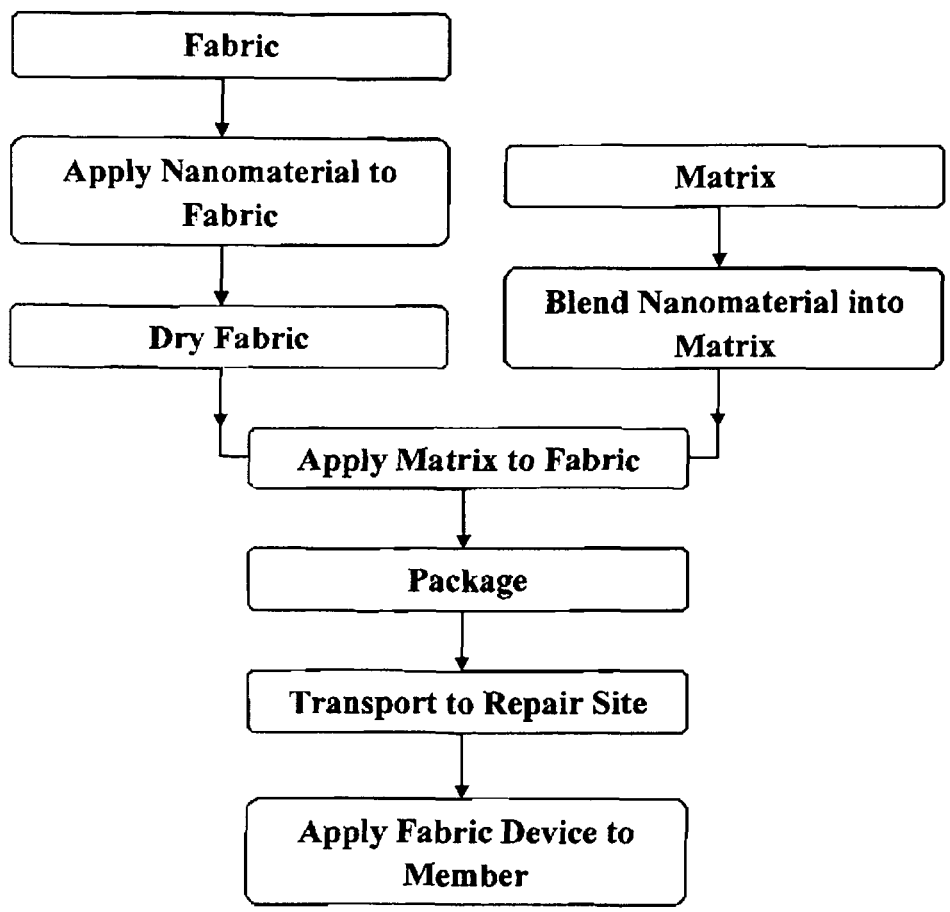
Figure 1E:
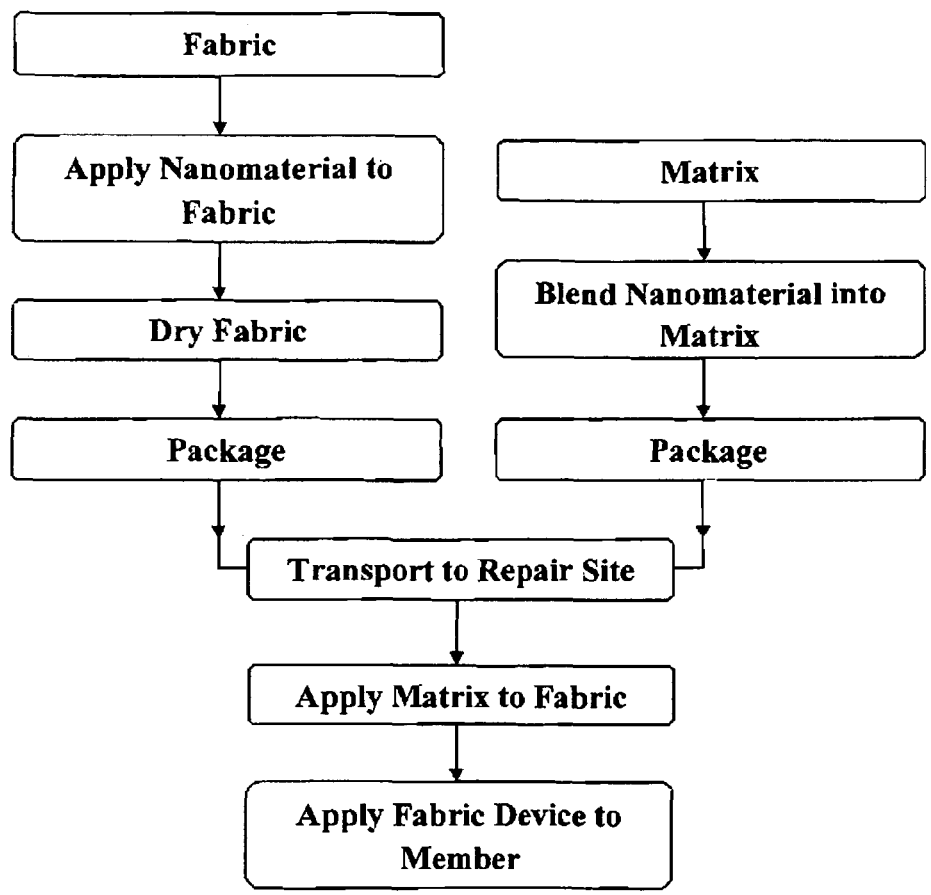

It is also within the scope of the present invention to provide a fabric device that is shipped without the matrix yet impregnated therein. FIG. 1C illustrates a method according to the present invention (like words indicate like steps and things), but in which a fabric device without a matrix is packaged and transported to the repair site. The resin matrix is prepared, packaged and transported to the repair site, where the resin matrix is applied to the fabric to form the fabric device. The matrix may be any disclosed herein and, in one aspect, the matrix is a matrix with nanomaterial added thereto as illustrated in FIG. 1D. The matrix with nanomaterials may be applied to the fabric before being transported to the repair site (FIG. 1D) or may be packaged, shipped to the repair site and applied to the fabric at the repair site (FIG. 1E).

Figure 1F:
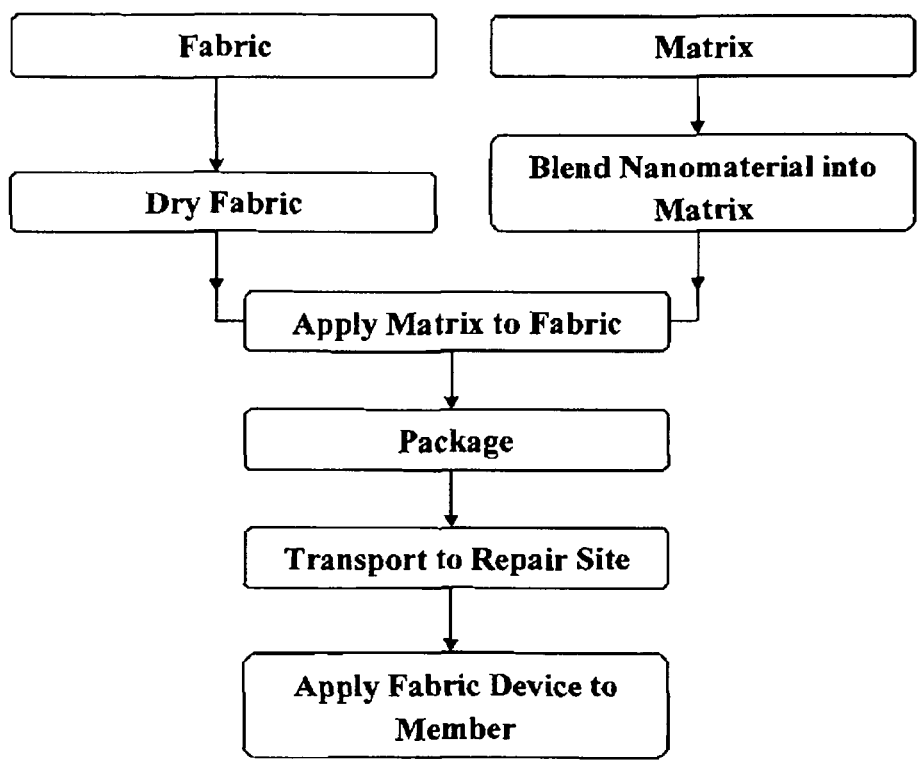
Figure 1G:
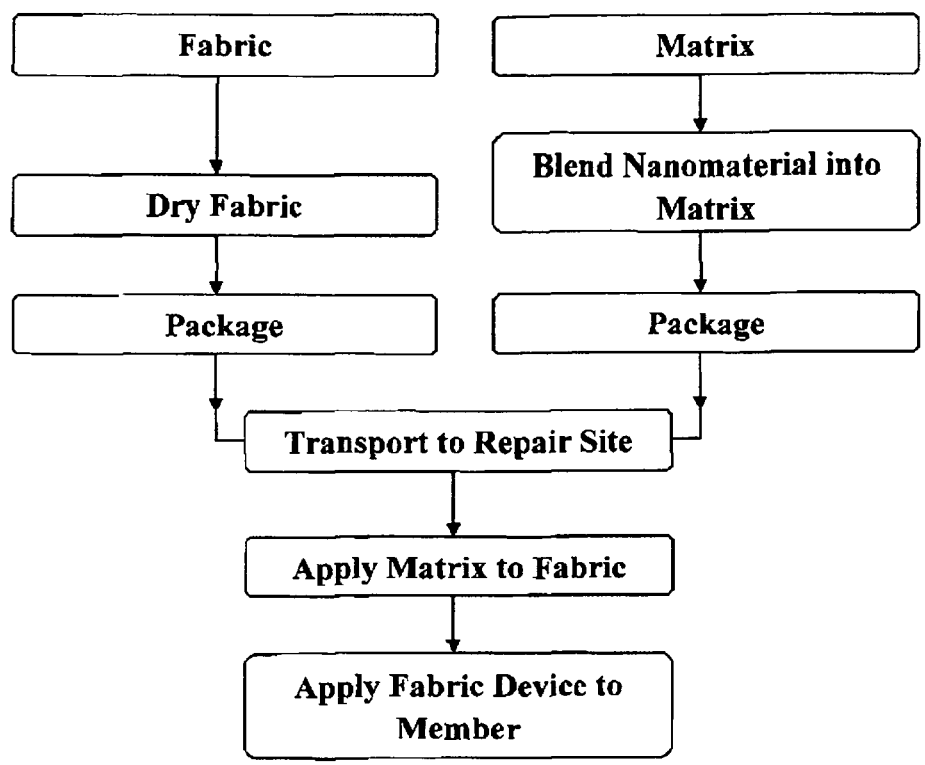

With reference to FIGS. 1F and 1G, in one embodiment of the present invention nanomaterials are not applied to the fabric, but are blended into the matrix. The matrix may be applied to the fabric before shipment to the repair site (FIG. 1F) or alternatively the matrix may be applied to the fabric at the repair site (FIG. 1G).

Figure 1H:
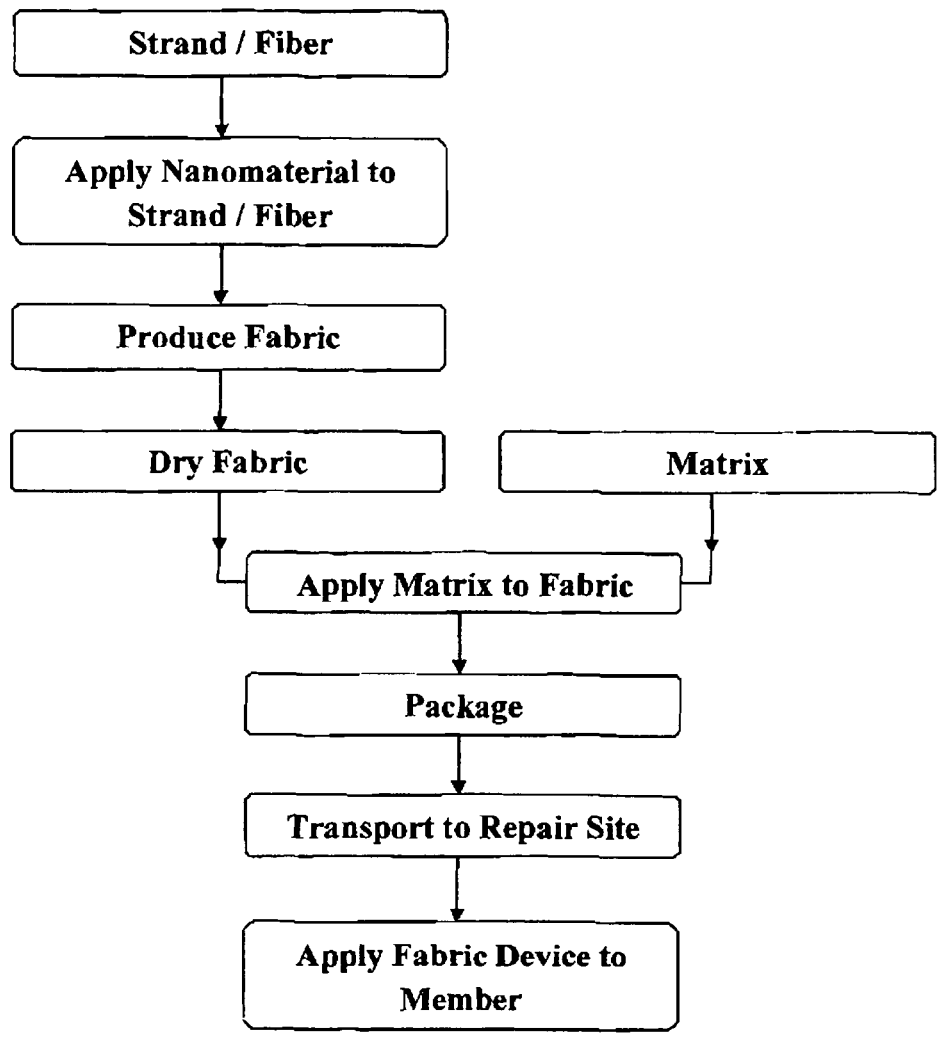
Figure 1I:
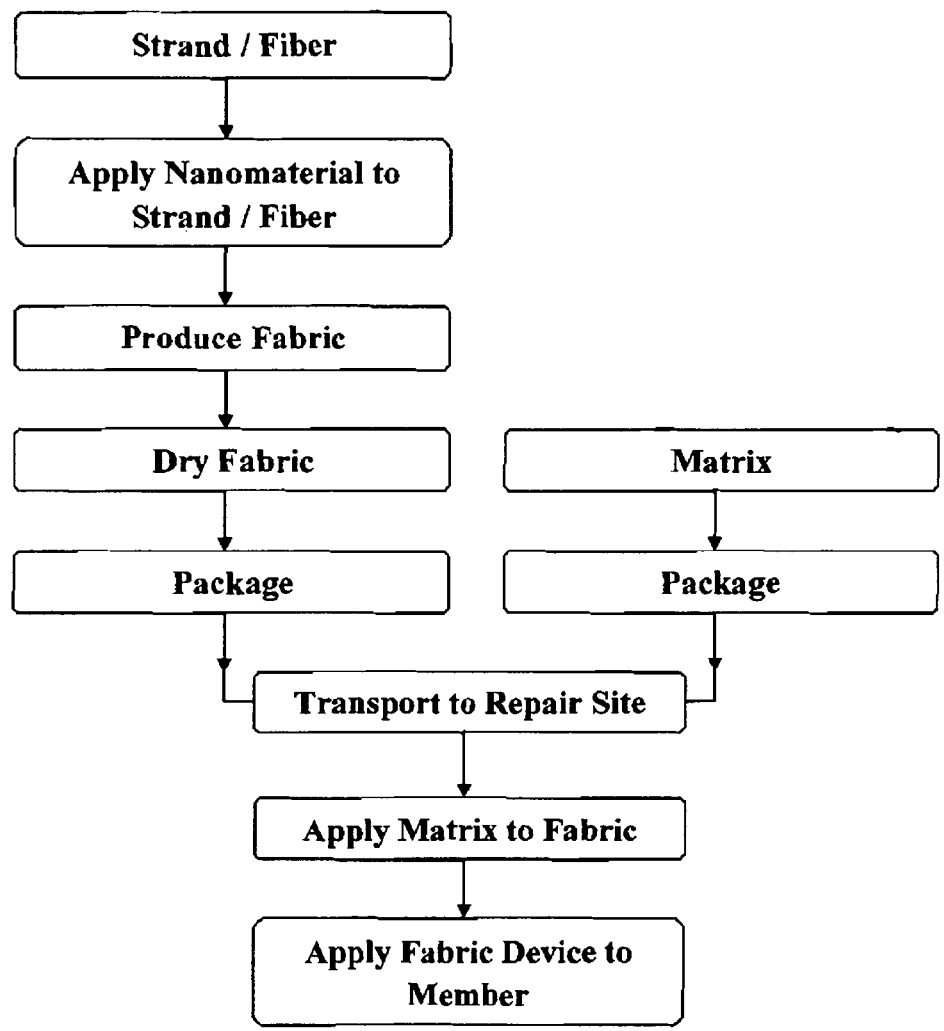
Figure 1J:
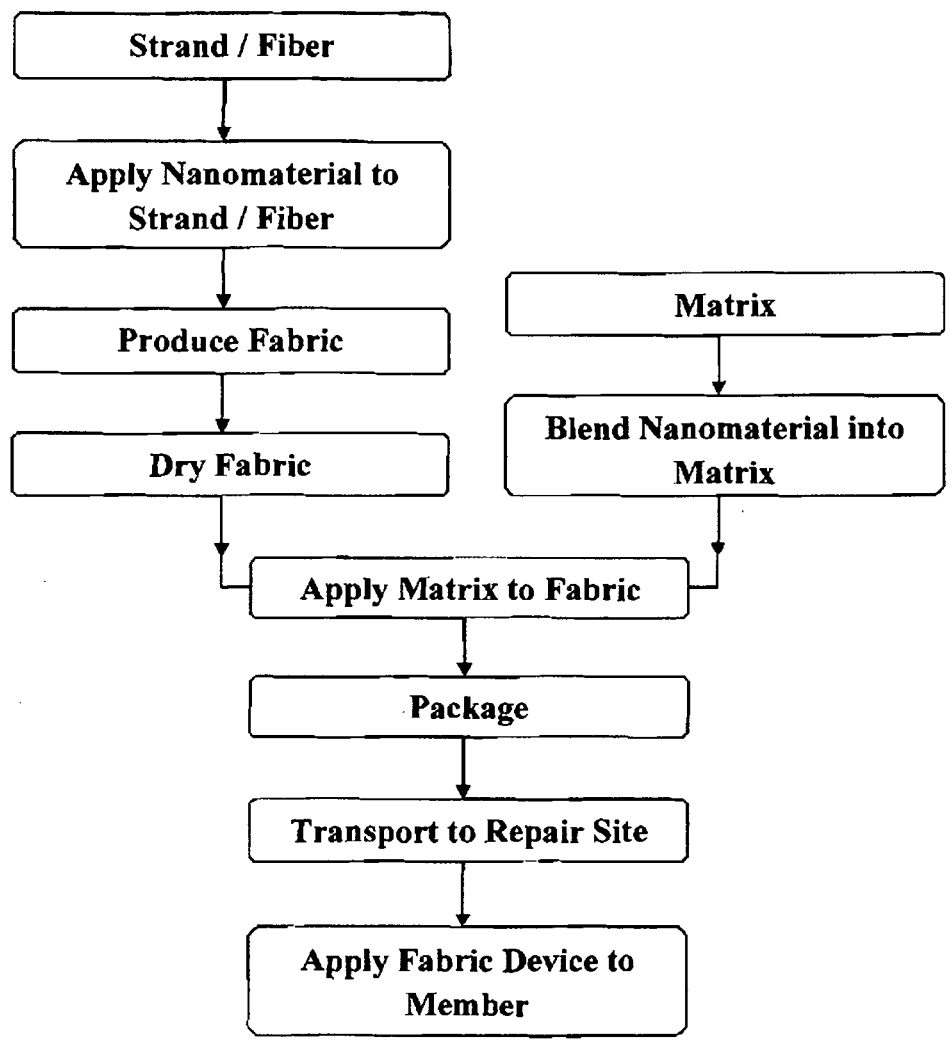
Figure 1K:
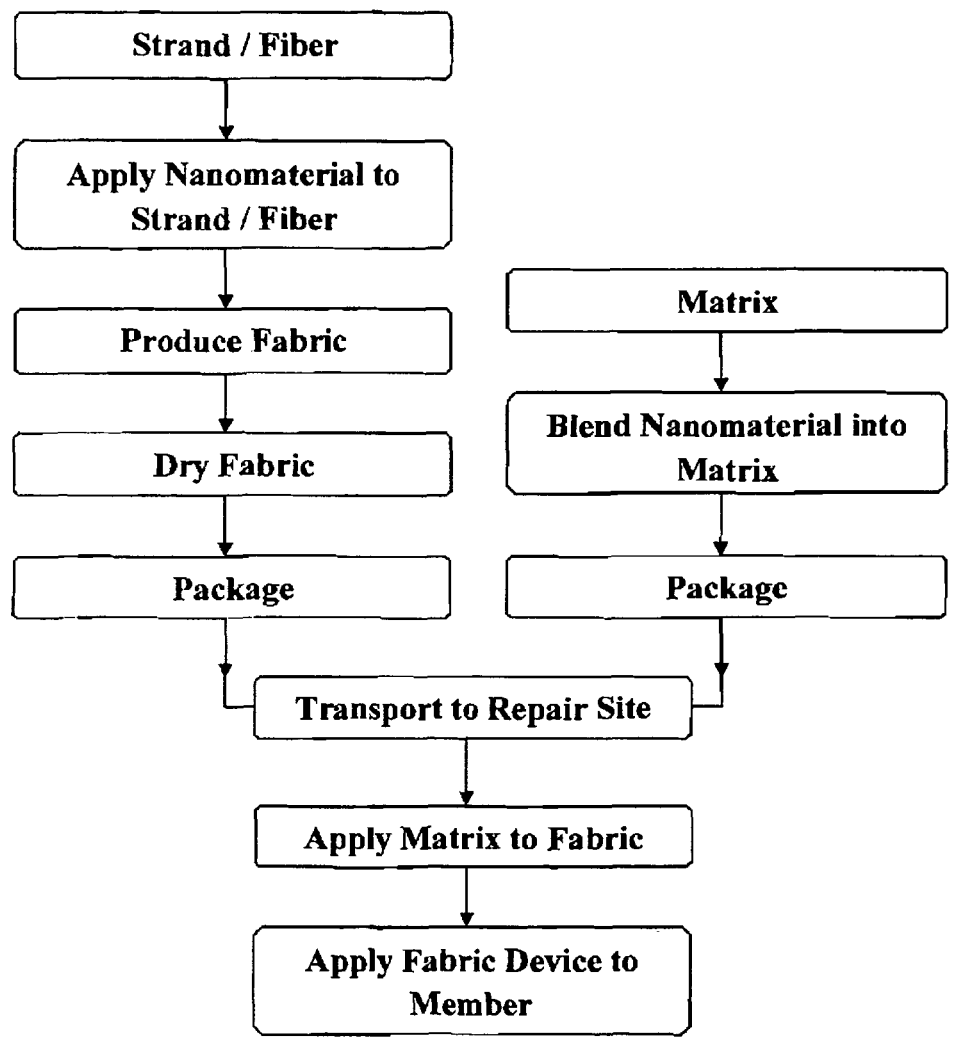

FIGS. 1H-1K illustrate methods according to the present invention (like words indicate like steps and things) in which nanomaterials are imparted onto a fiber or strand and the fiber or strand is woven into a fabric or a cloth. The fabric or cloth is then impregnated with a resin matrix to form a fabric device, and the fabric device may then be applied to a structural member to be repaired/reinforced. In certain embodiments (FIGS. 1J and 1K), the matrix may also have nanomaterials that are blended into the matrix. The matrix may be applied to the fabric to form a fabric device, and the fabric device may be packaged and shipped to the repair site where t is applied to the member to be repaired (FIGS. 1H and 1J). Alternatively, the fabric and matrix may be transported to the repair site where the matrix is applied to the fabric to form a fabric device and the fabric device is applied to the member to be repaired (FIGS. 1i and 1K).

Figure 1L:
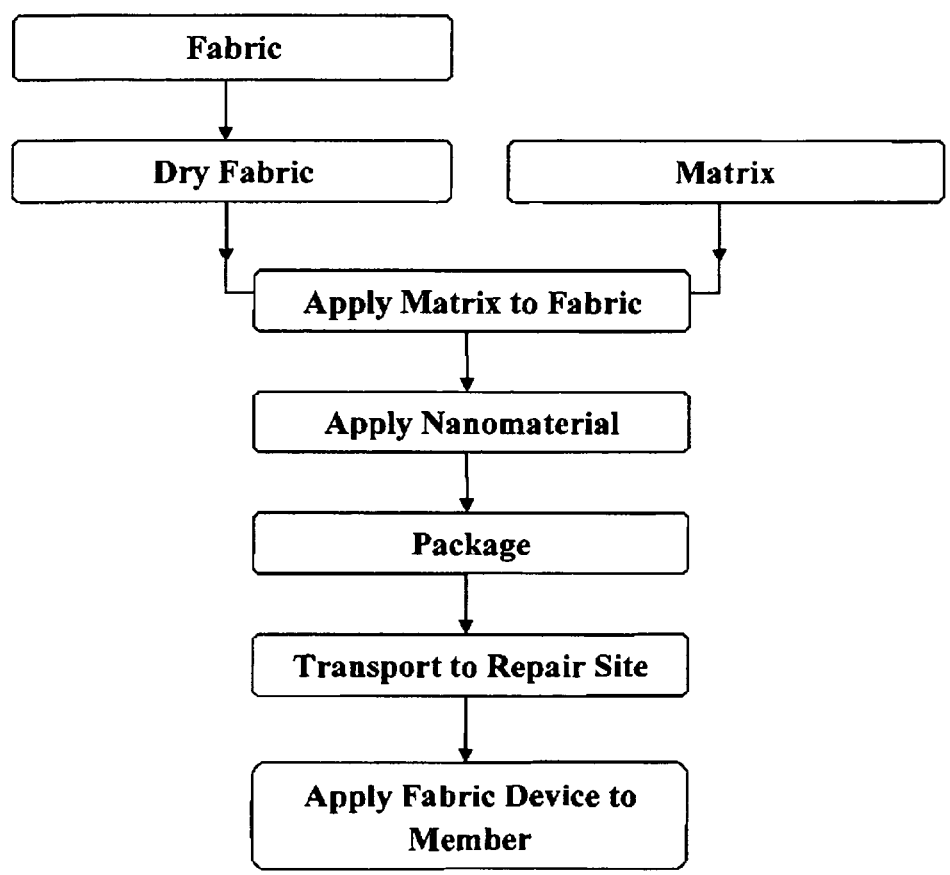
Figure 1M:
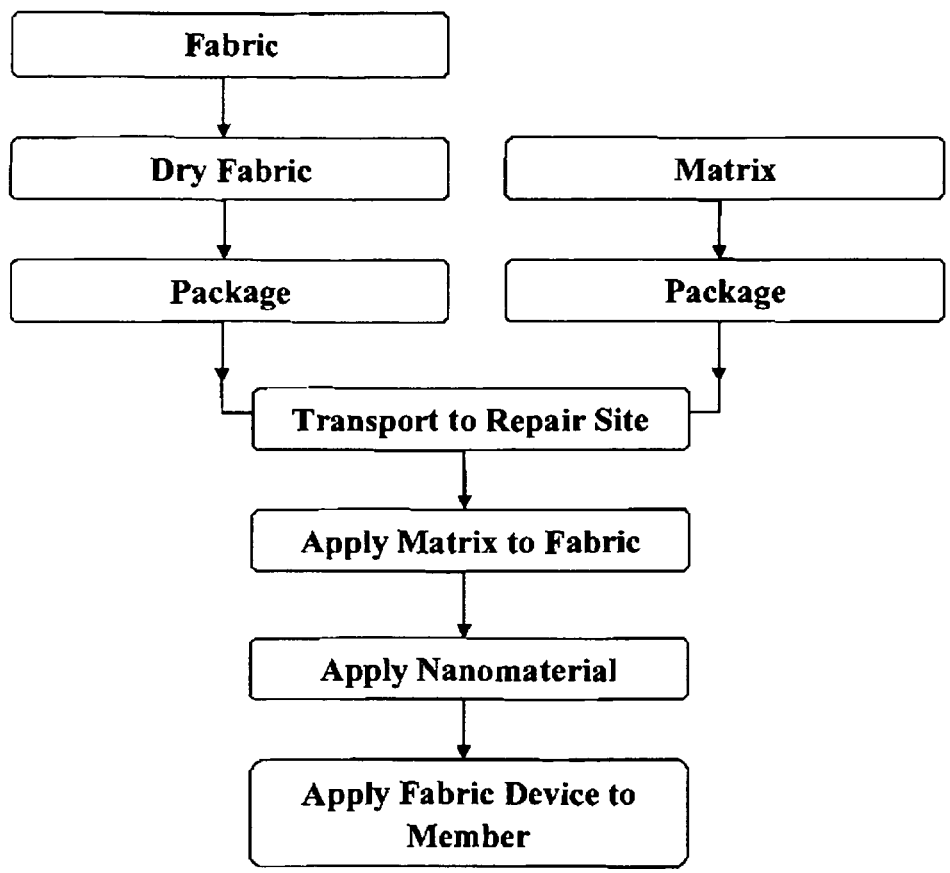

With reference to FIG. 1L, a fabric device in accordance with the present invention may be fabricated by applying a matrix to fabric at a location remote from the repair site and then applying nanomaterials to the fabric containing the matrix at the remote location. The fabric device is then packaged and transported to the repair site where it is applied to the member to be repaired. Alternatively, as illustrated in FIG. 1M, the fabric and matrix may be separately packaged and transported to the repair site. At the repair site, the matrix is applied to the fabric, and a fabric device according to the present invention is then fabricated by applying nanomaterials to the fabric containing the matrix.

The application of the matrix to fabric is done in a controlled, dry environment (in one aspect, in a dry inert gas atmosphere, e.g. using argon or nitrogen), especially if the resin used for the matrix is a moisture-curing resin. Any embodiment of a device according to the present invention may use moisture-curing resin. Dispersion of pieces of nanomaterial may, according to the present invention, be enhanced by energizing the nanomaterial prior to application, e.g. by sonication, either for nanomaterial mixed with a solvent or for nanomaterial added to a matrix.

Figure 2:
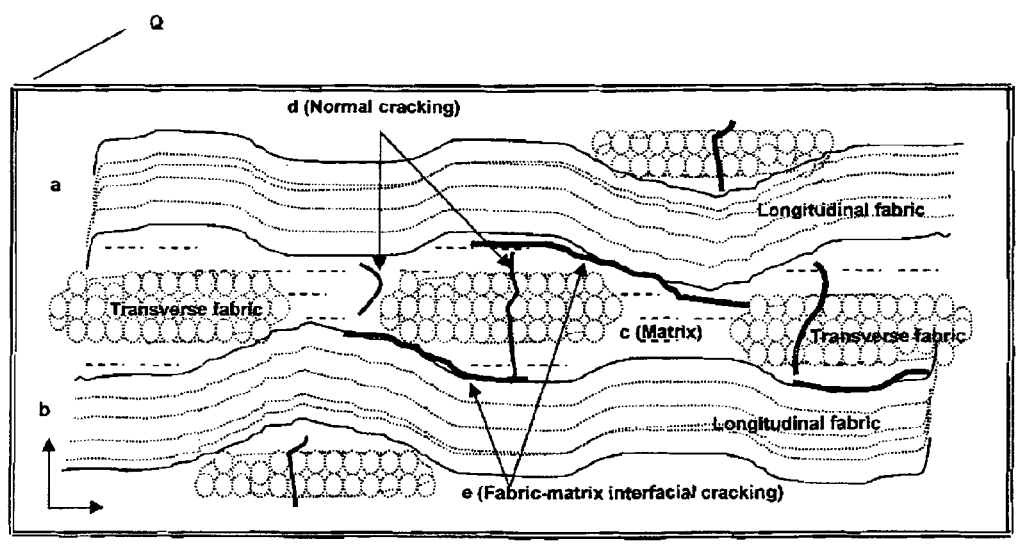
FIG. 2 is a cross-section view of a known repair device.

In devices without nanomaterial additives or constituents, fiber/matrix interfaces do not have nanomaterial to block cracks. In such a known device, cracking starts normal to an applied load (horizontal direction) and is propagated to the fabric-matrix interface, then propagated along the interface causing delamination of the fabric and matrix. This often leads to failure of the composite. FIG. 2 shows a known repair device Q with FRP fabric layers a, b, and a matrix region c with normal cracks d and interfacial longitudinal cracks e. The interfacial cracks e are between an interface of the fabric and a matrix applied in the fabric. In known devices like the device Q longitudinal crack propagation is along a fabric-matrix interface of a fiber reinforced composite laminate. Cracks d in such a device propagate to the matrix-fabric interface and then propagate principally as longitudinal fabric-matrix interfacial cracks or as cracks in an adhesive leading to delamination in fabricated composite.

Figure 3:
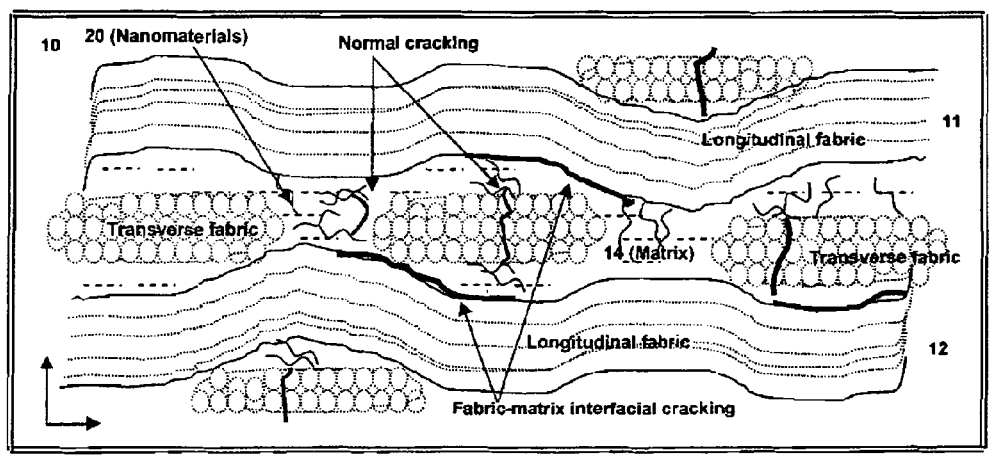
FIG. 3 is a cross-section view of a repair device according to the present invention.

When, according to the present invention, one or both surfaces of fabric are coated with nanomaterial as described above, the fabric is reinforced at its interface(s) with a matrix and cracks propagate away from the interface(s) in what is a cohesive mode that is more resistant to crack propagation than an adhesive mode (as seen in FIG. 2). FIG. 3 illustrates a fabric device 10 according to the present invention with fabric layers 11, 12 with a matrix 14 each with embedded nanomaterial; in this case, embedded carbon nanotubes 20.

In certain embodiments, in a device according to the present invention cracks behave differently after the nanomaterial is embedded. The cracks run away from the nanomaterial-reinforced fiber/matrix and do not permeate the fiber-matrix as aggressively as in prior devices because the matrix (resin) and the fibers have more strength due to the added surface area supplied by the nanomaterial. The nanomaterial delays the ability of a crack to spread farther or as quickly. The nanomaterial arrests cracks about 30% more by being present in the material. Cracks become relatively smaller and less prevalent.

Due to the presence of the nanomaterial in the device 10, the fabric/matrix interfaces are reinforced, mitigating longitudinal fabric-matrix crack growth and subsequent delamination. Cracks tend to propagate in the more resistant cohesive region rather than the adhesive region of the fabric-matrix interface. Normal cracks initiating in the matrix or in transverse yarn are blunted at interface.

Figure 4:
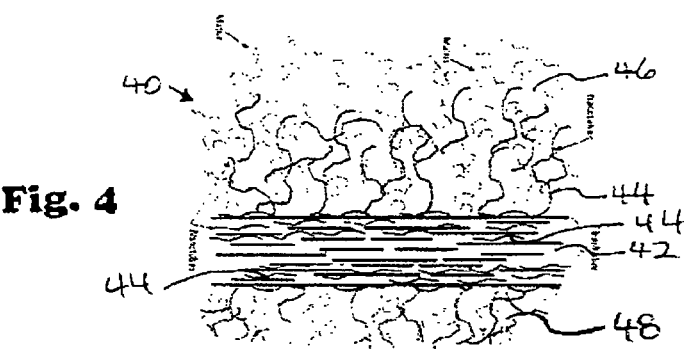
FIG. 4 is a cross-section view of a repair device according to the present invention.

FIG. 4 shows a fabric device 40 as a component of a repair system according to the embodiment of the present invention, with fabric layers 42 toughened by the addition of functionalized or unfunctionalized nanomaterials 44 in a matrix 46. The device 40 has a toughened fabric/matrix interfacial region. Optionally, and as is true for any fabric in any embodiment of the present invention, a matrix 48 (like the matrix 46) is on a surface of the fabric layers 42 opposite that of the surface on which is the matrix 46. FIG. 4 shows that, after nanomaterials are deposited on the fabric, with some infusing of nanomaterials into the fabric and into the matrix, the matrix remains on the fabric surfaces. In this embodiment, some nanomaterials are dispersed from the fabric into the matrix near the fabric surface. This makes a strengthened and toughened resin around the fabric which mitigates fiber-matrix cracking and which can, in certain locations force a crack to deviate away from the regions reinforced with nanomaterials.

Figure 5:
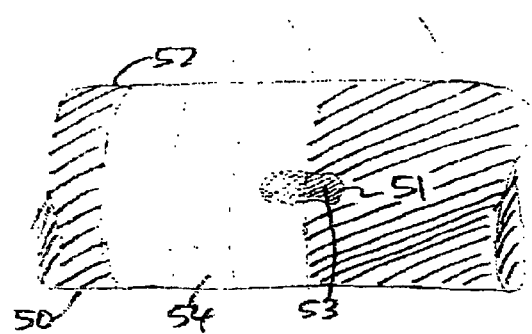
FIG. 5 is a perspective view illustrating a method according to the present invention.
Figure 6:
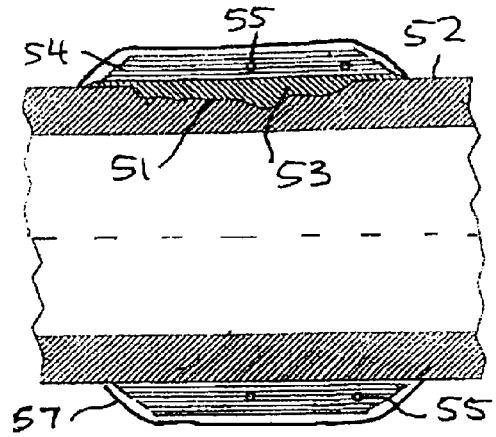
FIG. 6 is a cross-section view of part of a pipe of FIG. 5.

FIG. 5 shows a portion 52 of a pipeline 50 which has a degraded area 51. In accordance with one aspect of the invention, and as shown in FIGS. 5 and 6, a load transfer filler material 53, which preferably also contains nanomaterials, is applied into and/or onto the degraded area 5 (see also FIG. 6). A repair system in accordance with the present invention further includes a fabric device 54 that is wrapped around the pipeline 50 in multiple overlapping layers to cover the filler material 53 and the degraded area 51. Wrapping is in progress as shown in FIG. 5. Optionally, the fabric device 50 further includes a layer of shrink wrap material 57 (see FIG. 6) covering the fabric layers. Optionally, and as is true for any device according to the present invention, the fabric layers include a metal wire or wires 55 (see FIG. 6) for facilitating location of the repaired area, e.g. on an underground pipe or pipeline, by a detection apparatus.

Figure 7A:
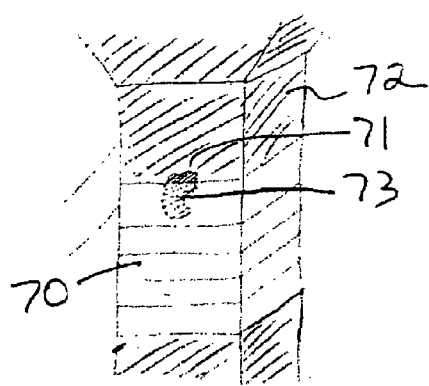
FIG. 7A is a perspective view illustrating a method according to the present invention and a structural member according to the present invention.

FIG. 7A shows a structural column 72 which has a degraded area 71. Load transfer filler material 73 which also preferably contains nanomaterials, has been applied to the degraded area 71 and a fabric device 70 according to the present invention is being wrapped around the column in overlapping layers. Upon completion, the layers of the fabric device 70 will cover the filler material 73 and the degraded area 71.

Figure 7B:
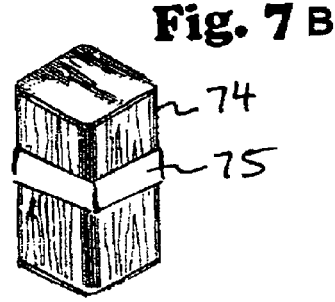
FIG. 7B is a perspective view illustrating a post according to the present invention.

FIG. 7B shows a wooden post 74 according to the present invention. A fabric device 75 according to the present invention (any disclosed herein, sized and configured as shown) has been wrapped around the post 74 to reinforce it.

Figure 7C:
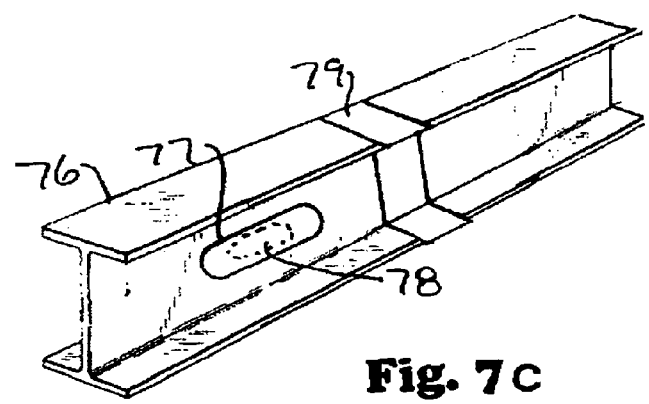
FIG. 7C is a perspective view illustrating an I-beam according to the present invention.

FIG. 7C shows a steel I-beam 76 according to the present invention. A fabric device 77 according to the present invention (any disclosed herein, sized and configured as shown) has been applied over a degraded area 78 filled with load transfer material (not shown). Another device 79 according to the present invention has been wrapped around the I-beam 76 to reinforce it. As is true for any device and method according to the present invention, adhesive may be used to facilitate the installation of the devices 75, 77 and 79 on their respective members.

Figure 8:
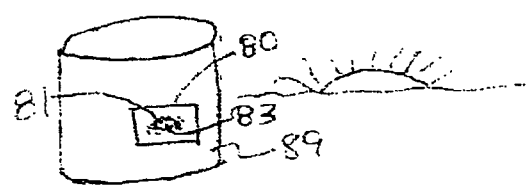
FIG. 8 is a perspective view illustrating a method according to the present invention.

FIG. 8 shows a petroleum storage tank 89 with a degraded area 81 filled with load transfer filler material 83 and covered with a fabric device 80 according to the present invention. The fabric device 80 (as is true for any embodiment herein and any repaired or reinforced member according to the present invention) does not encircle or wrap completely around the storage tank 89. The fabric device 80 is a carefully sized piece sufficiently large to cover the filler material 83 and the degraded area 81. In any embodiment of the present invention, any desired effective amount of nanomaterial may be used on fabric, typically 5% or less by weight.

Figure 9:
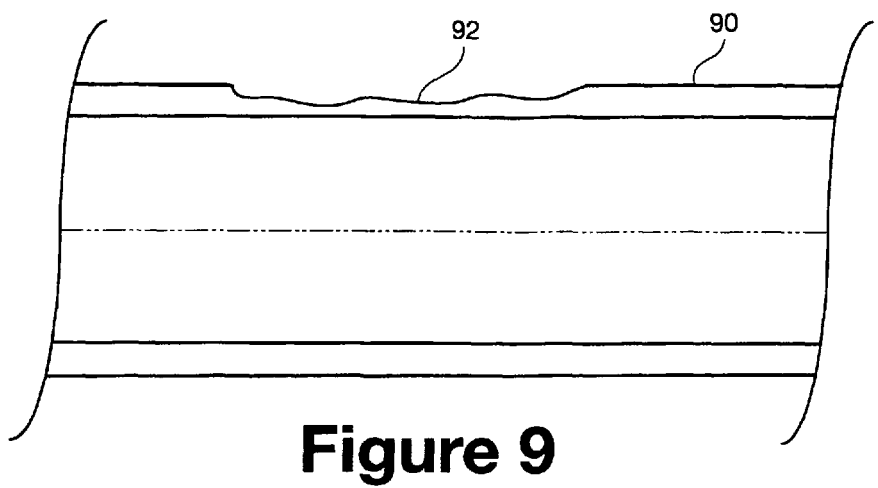
FIG. 9 is a side cross-sectional view of a tubular member (pipe) to be repaired in accordance with one embodiment of the invention.
Figure 10:
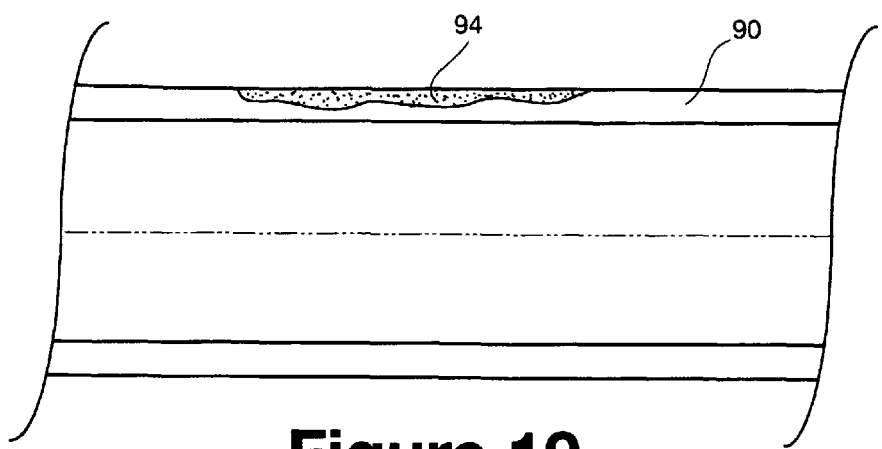
FIG. 10 is a side cross-sectional view of the tubular member of FIG. 9 having a load transfer filler material applied to a degraded portion thereof.

FIGS. 9-12 illustrate another exemplary embodiment of the invention. FIG. 9 shows a section of pipe 90 have a degraded portion 92. As shown in FIG. 10, one embodiment of the invention involves first applying a load transfer filler material in the degraded portion 92. Preferably, and in accordance with one aspect of the invention, the load transfer filler material 94 is nano-enhanced, i.e., contains nanomaterial(s) which serve to strengthen and reinforce the material 94.

Figure 11:
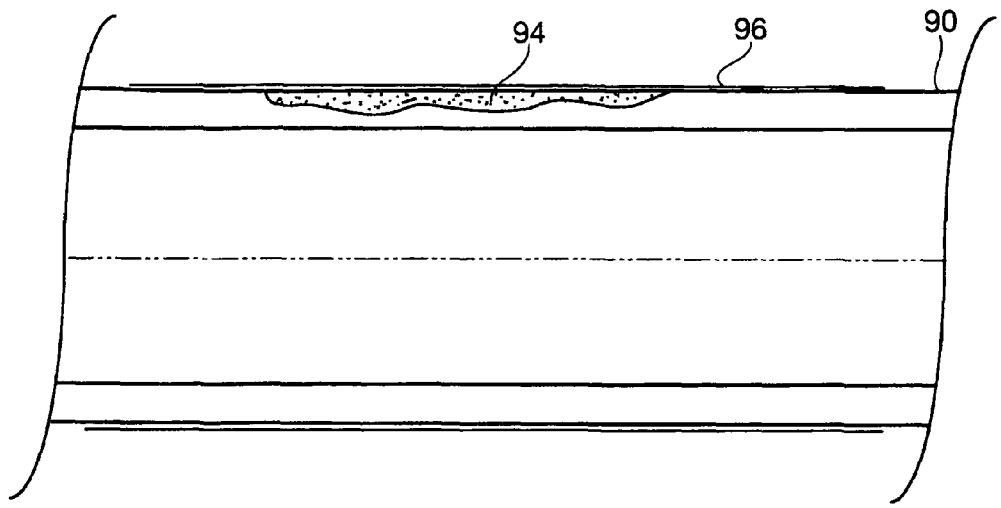
FIG. 11 is a side cross-sectional view of the tubular member of FIG. 9 having a nano-enhanced adhesive layer applied thereon.

FIG. 11 shows a further step in the instant embodiment, in which a separate adhesive layer 96 is applied over the repair area, including load transfer filler material 94. In one embodiment of the invention, adhesive 96 is also nanoenhanced, containing either same or different nanomaterial(s) as the load transfer filler material 94 and/or the fabric device 96.

Figure 12:
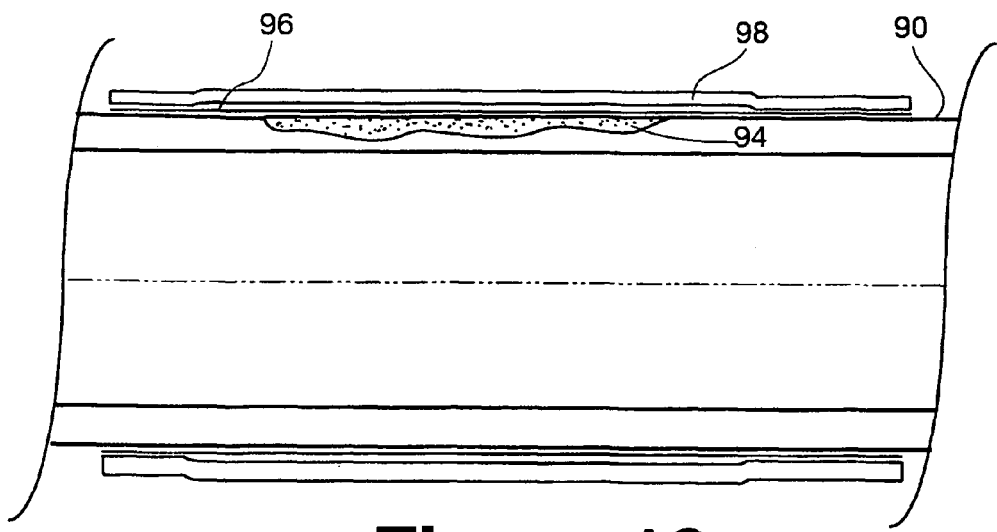
FIG. 12 is a side cross-sectional view of the tubular member of FIG. 9 having a nano-enhanced fabric device in accordance with one embodiment of the invention applied over the degraded area.

FIG. 12, in turn shows a fabric device 96 that is applied over the treated area. As described above, fabric device 96 comprises a fabric substrate that is treated with nanomaterials. By "treated" it is meant that nanomaterials may be applied to one or both surfaces of the materials, and/or infused throughout the fabric material In any method according to the present invention, the fabric as provided may be an amount (e.g. a piece or a roll) of fabric with resin already on the fabric (and not applied following drying). The fabric may, as described above, be wetted with the matrix, e.g. a two-part epoxy resin; or the fabric may have both parts of a two-part epoxy resin applied to it after which it is cooled or frozen to prevent resin curing. With the latter alternative, a previously-frozen device may be heated to "kick start" resin curing.

The present invention, therefore, is a repair system which provides in some, but not in necessarily all embodiments a fabric device for application on an area of a member, the fabric device having: at least one layer of fabric, the at least one layer of fabric having a first surface and a second surface spaced-apart from the first surface, the fabric made of composite material; nanomaterial bonded to at least one surface of the fabric, and/or embedded within the fabric; and a resin matrix, also incorporating nanomaterials, on the fabric over the nanomaterial. The term "at least one surface of the fabric" is to be understood to include one surface or both the first surface and the second surface with nanomaterial bonded to one or both surfaces and/or infused into the fabric; the "at least one layer of fabric" may comprise a plurality of adjacent layers of fabric and at least one surface or both surfaces of each layer has nanomaterial thereon; the nanomaterial is one of (treated or untreated) nanotubes, nanofibers, nano whiskers, graphene, nanoclays, nanowire, nanoinclusions, and bucky paper; the resin matrix is one of thermosetting resin, epoxy resin, thermoset polymer, thermoplastic polymer, and polyurethane resin; and/or nanomaterial in the resin matrix for inhibiting or stopping crack propagation.

The present invention, therefore, is a repair system which provides in some embodiments a treated member including: a member with a degraded area; a load transfer filler material containing nanomaterials applied on said degraded area; a fabric device on the area, the fabric device having at least one layer of fabric, the fabric made of composite material, the at least one layer of fabric having a first surface and a second surface spaced-apart from the first surface, nanomaterial bonded to at least one surface of the fabric and/or infused into the fabric, and a nanomaterial-containing resin matrix on the fabric over the nanomaterial; and such a treated member wherein the member has a degraded area and the fabric device is applied to the degraded area. As noted above, nanomaterial-containing load-transfer material may be applied in and to the degraded area prior to application of the fabric device.

What is claimed is:

1. A method of reinforcing a pipe, comprising:
   (a) preparing a fabric device for application on an area of the pipe, the fabric device comprising:
   a load transfer filler material, containing nanoclay, applied to the area;
   at least one layer of fabric having first and second spaced apart surfaces and nanoclay applied to at least one of the first and second surfaces and being at least partially infused into the fabric; and
   a resin matrix on the fabric, the nanoclay being at least partially infused into the resin matrix, wherein the resin matrix is one of thermosetting resin, epoxy resin, thermoset polymer, thermoplastic polymer, and polyurethane;
   (b) applying the fabric device to the area of the pipe;
   (c) curing the resin matrix;
   whereby cracks in the fabric device tend to propagate away from the interface between the matrix and the fabric, reducing the likelihood of delamination of the fabric device.

2. The method of claim 1, wherein the nanoclay is bonded to at least one surface of the fabric.

3. The method of claim 2, wherein the at least one surface of the fabric comprises both the first and second surfaces of the fabric.

4. The method of claim 2, wherein at least one layer of fabric is a plurality of adjacent layers of fabric and at least one surface of each layer has nanoclay thereon.

* * * * *